Figure 1:
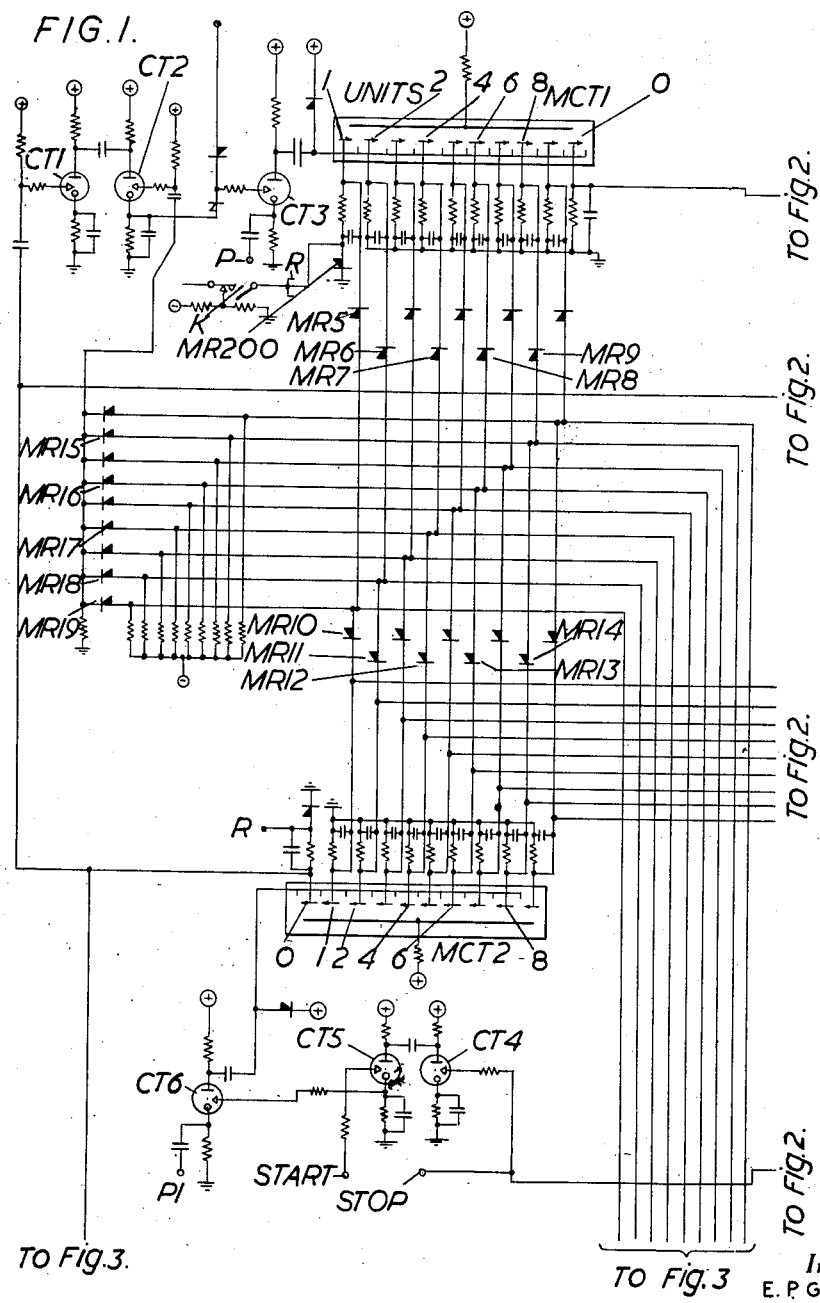

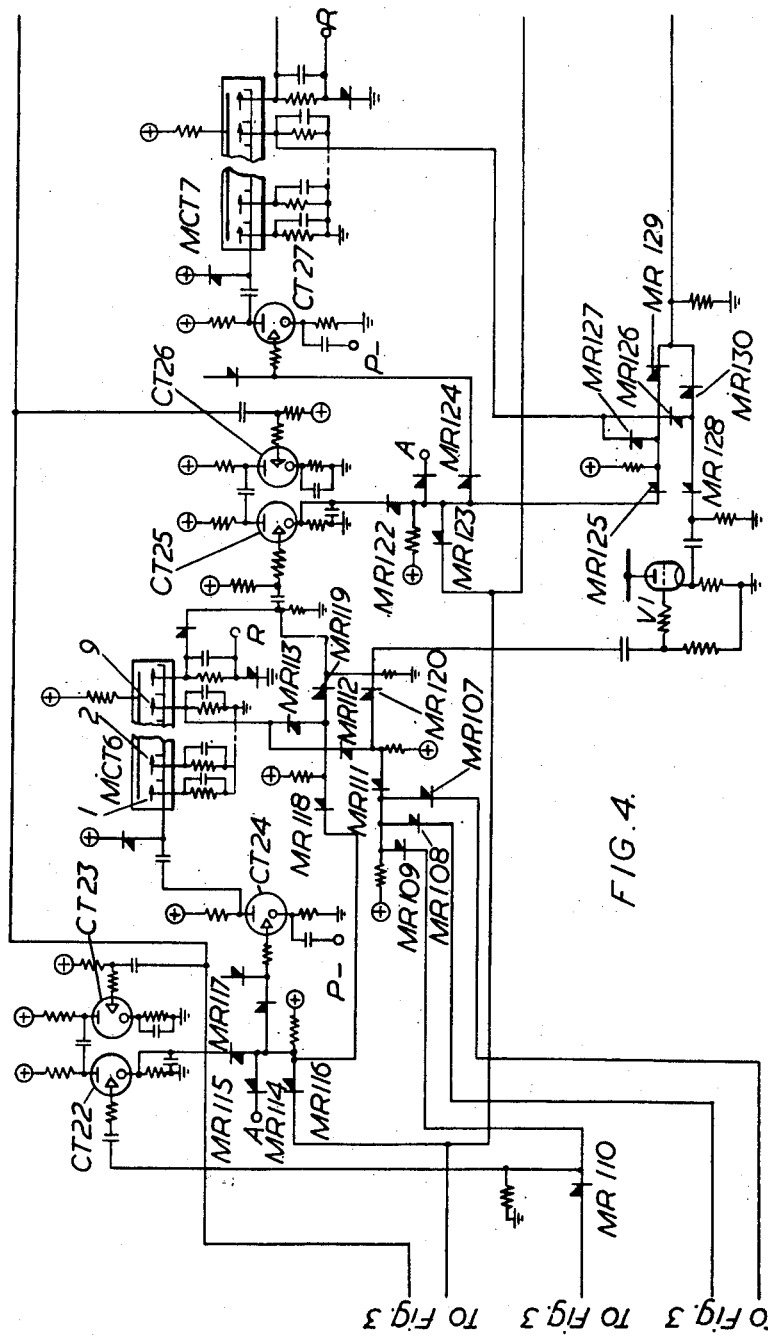

United States Patent Office

3,039,689
Patented June 19, 1962

1

3,039,689
ELECTRICAL NOTATION CONVERTING CIRCUITS
Esmond Philip Goodwin Wright and Joseph Rice, London, England, assignors to International Standard Electric Corporation, New York, N.Y.
Filed Sept. 16, 1954, Ser. No. 456,509
Claims priority, application Great Britain Nov. 28, 1949
8 Claims. (Cl. 235—155)

This invention relates to electrical equipment for use, for instance, in electrical calculating equipment, accounting machines and other equipment in which the performance of mathematical operations is involved.

Such equipments usually comprise devices into which two or more numbers are fed in succession in order to summate the numbers, and such devices are known as aggregators or accumulators.

This application is a continuation in part of application No. 197,206, now abandoned, filed November 24, 1950.

One feature of the invention comprises electrical equipment comprising a cyclic pulse distributor and an accumulator advanced during each cycle of said distributor by an amount equal to the amount presently accumulated by said accumulator.

Another feature of the invention comprises an electrical number recording device comprising means for receiving, digit by digit, a number expressed in binary notation, and means for directly recording said number in a notation other than binary.

Another feature of the invention comprises a number recording device comprising means for recording a first number in a notation other than binary, means for receiving, digit by digit, a second number expressed in binary notation, and means for directly recording, in a notation other than binary, the product of said first and said second numbers.

Another feature of the invention comprises electrical equipment comprising a first number accumulator, means for adding into said first accumulator the number already recorded in said first accumulator, a second number accumulator, and means for adding to said second accumulator the number added to said first accumulator.

Another feature of the invention comprises electrical equipment comprising means for generating in sequence a plurality of trains of pulses, the numbers of pulses in successive trains being in geometric progression, means for progressively totalling the pulses of certain of said trains of pulses, and means for selecting said certain trains of pulses.

Another feature of the invention comprises electric equipment comprising means for generating trains of electrical pulses in geometric progression, means for progressively accumulating all the trains of pulses in said geometric progression, means for progressively accumulating certain of said trains of pulses, and means for selecting said certain trains of pulses.

Another feature of the invention comprises electrical equipment comprising a first number accumulator, means for repeatedly adding into said first accumulator the number already recorded in said accumulator, a second number accumulator, and means for selectively adding into said second accumulator certain of the numbers added into said first accumulator.

In certain of the claims which are appended to this specification reference is made to "pulse arrangements." A "pulse arrangement" comprises a number of pulse

2 trains, which number might equal one, and of which any one or more pulse trains may comprise only one pulse.

Figure 2:
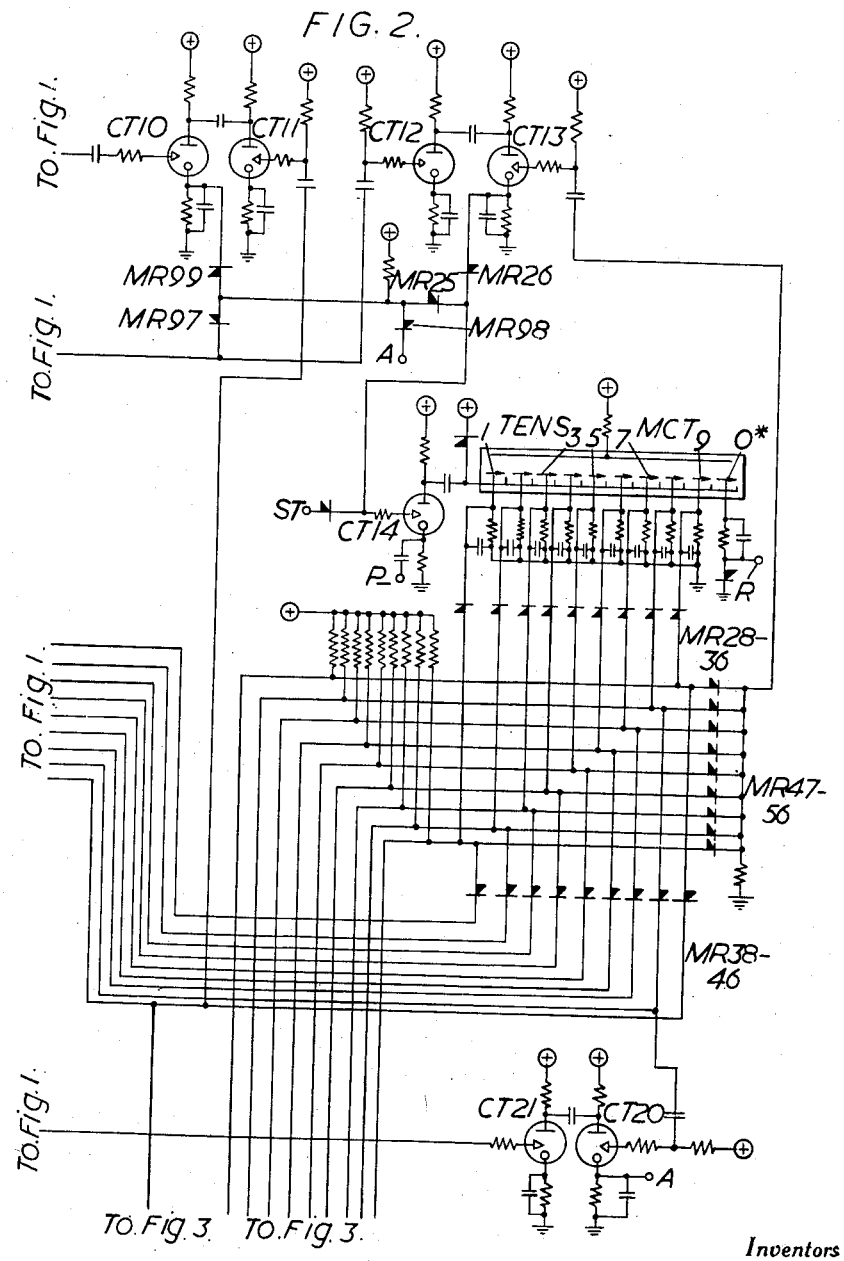

These and other features of the invention will be clearly understood from the following description of one embodiment of the invention read in conjunction with the accompanying drawings, in which:

FIGS. 1 and 2, of which FIG. 2 should be placed to the right of FIG. 1 show cold cathode gas filled multi-gap discharge tube circuits in which are accumulated respectively the units and tens digits of numbers controlled in conjunction with another multi-gap tube circuit arranged for continuous stepping.

Figure 3:
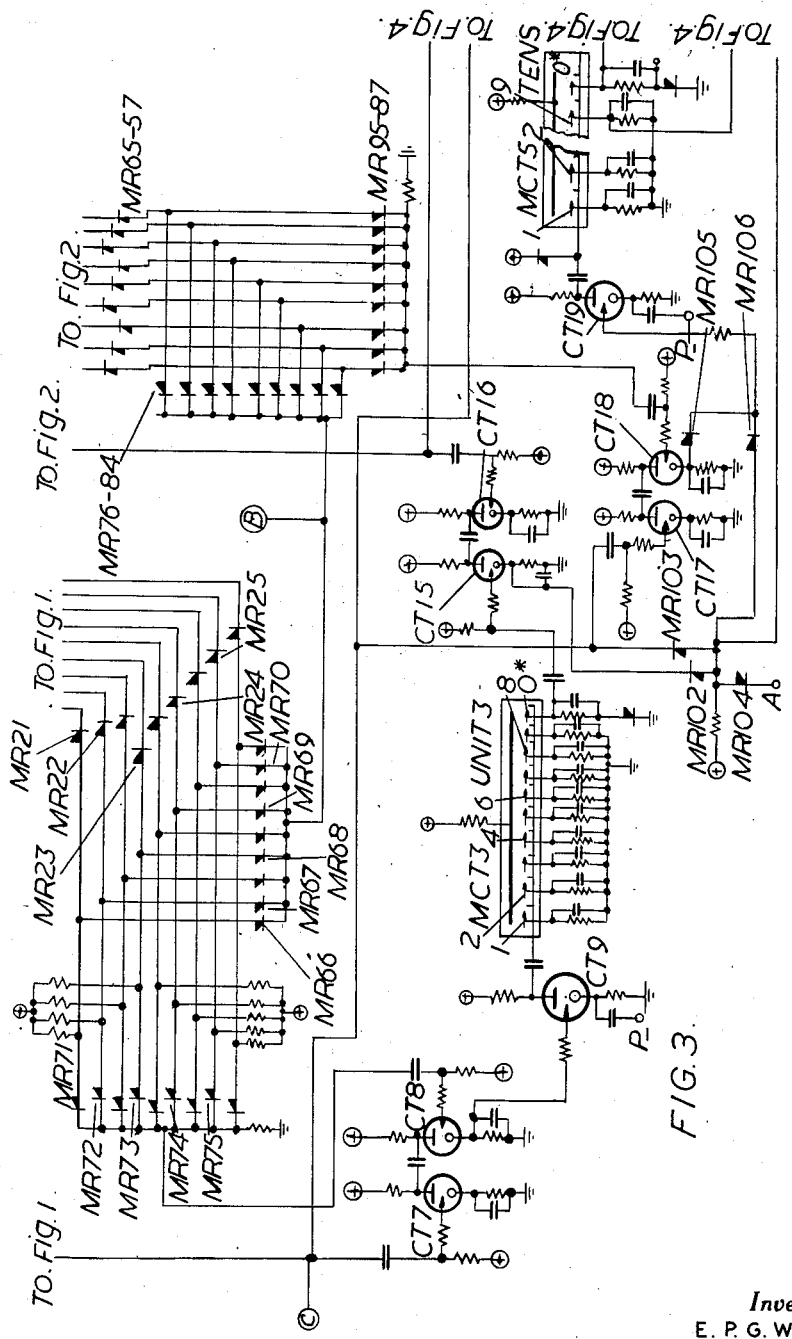

FIG. 3, which should be placed below FIGS. 1 and 2 shows a multi-gap tube circuit in which are accumulated respectively the units and tens digits of some or all of the numbers accumulated in the accumulator shown in FIGS. 1 and 2.

FIG. 4, which should be placed to the right of FIG. 3, shows an addition to the accumulator shown in FIG. 3 to cater for certain circuit contingencies.

In the embodiment to be described, use is made of static electrical switches and other electronic devices.

For the purpose of this specification and the claims thereof, a static electrical switch is defined as a device having a permanently positioned electrical path the effective impedance of which may be either of two different values, change from the one to the other value being effected by appropriate change in a controlling electric or magnetic field from one stable condition to another. The term "static electrical switch" specifically includes such devices as thermistor trigger circuits, hot cathode gas-filled discharge tubes, cold cathode gas-filled discharge tubes, hard tube trigger circuits, transistors and magnetic trigger devices.

Where an item of equipment is defined by the adjectival phrase "static electrical," that item consists of one or more static electrical switches.

The operation of the embodiment will be escribed by describing first the manner in which the accumulator shown in FIGS. 1 and 2 functions. Turning first to FIGS. 1 to 3, MCT1, MCT2 and MCT4 are cold cathode, gas-filled, multi-gap, discharge tubes, each having ten independent cathodes connected through individual resistance-capacity networks to earth in known manner. These tubes are preferably of the type described and claimed in our United States Patent No. 2,553,585 (G. H. Hough). Each of the tubes MCT1, 2, and 4 has a discharge trigger tube, CT3, CT6 and CT14 respectively, controlling a supply of positive pulses P to the multi-gap tubes, and each trigger tube has an electronic gating means in the form of a start-stop tube combination, CT1 and 2, CT4 and 5, CT12 and 13 respectively, all connected, as to their anodes and cathodes, in known manner. In the normal or rest condition, tube MCT1 is discharging through its cathode 1 and tubes MCT2 and 4 are discharging through their cathodes 0. This is ensured by the resetting device shown connected to cathode 1 of MCT1. This comprises rectifier MR200 connected between the lower end of the CR circuit for cathode 1 and earth. This rectifier is so poled that the lower end of the CR circuit can go negative to, but not positive to, earth. When the equipment is switched on, a contact K is closed. Since this contact is a make-before-break contact, during the bunching time of its contacts a negative pulse is applied to the upper end of MR200. This increases the voltage across the gap formed by cathode 1 and the anode to a value which will fire that gap whether or not any gap is then discharging. When that gap fires, any other discharging gap is extinguished.

The other MCT tubes have similar rectifier connections on their rest cathodes, all receiving the switching-on pulse from K. This is shown by marking these connections R, for reset. Such a circuit is a well-known method of initially setting the discharge in a multi-gap tube. This contact K has been shown in the interest of simplicity as a make-before-break contact, but can be operated manually or automatically, e.g. by a switch-on-relay.

From the cathode 0 of MCT2 a positive potential is applied through condensers to the starting electrodes of CT1 and CT12. Tubes CT1 and CT12 thereupon discharge. The remaining tubes CT2, 3, 4, 5, 6, 10, 11, 13, 14, 20, 21 are not discharging.

The circuit shown uses coincidence gate circuits of the type which use rectifiers. In such a gate circuit a common point, which is the output point of the circuit, is connected to a number of control points and to a source of biassing positive potential. The connection to the biassing source includes a resistance and the connections to the control points each include a rectifier. The potential of a control point can assume two distinct values, one being at or near earth potential, and the other being a positive potential.

The rectifiers are so orientated as to be in the direction of easy conductivity for current flowing from the biassing source through the rectifiers to the respective control points. Thus the effect of the rectifiers is to hold the common point at the potential of the least positive of the control points. This arrangement is such that if nominally equal positive potentials are simultaneously present on all control points of a gate circuit, the potential of the common point of that gate circuit is substantially equal to the nominal control point potential. Thus the common point only assumes a positive potential when positive potentials are simultaneously present on all the control points. This common point potential equals that of the least positive of the control point potentials.

It will be noted that the connection from the common point of a gate circuit to the next stage of the circuit usually includes a rectifier orientated in the direction of easy conductivity for current flowing from the common point to the next stage of the circuit. Such rectifiers serve as decouplers.

When a pulse of suitable positive potential is applied to the start lead connected to the starter electrode of CT5, CT5 fires and remains alight. Positive from the cathode of CT5 is applied to the starter electrode of CT6, and for every pulse on the lead P, CT6 fires and its negative-going anode output pulse transfers the discharge in MCT2 to the next cathode, travelling in the direction 0—9—8—7 etc. At the first step, when the discharge reaches cathode 9, a pulse of positive potential from cathode 9 passes through a condenser to the starter electrode of CT11. CT11 fires and remains alight. At the second step, when the discharge reaches cathode 8, a pulse of positive potential from cathode 8, is applied through a condenser to the starter electrode of CT20. This tube fires and the potential of its cathode goes positive, giving a positive output at the point marked A. This point A is connected to rectifier MR98 (FIG. 2), (and, as will be later explained, to other similar points, such as rectifier MR104 (FIG. 3)). The positive potentail biasses rectifier MR98 positive but does not affect the starter electrode of CT14 at this time due to the short circuiting effect produced by rectifiers MR99 and 97 and the respective cathode networks to which they are connected. The discharge in MCT2 continues to pass from cathode to cathode producing a pulse of positive potential at each one in turn, the tube thus acting as a cyclic pulse distributor. When the discharge reaches cathode 1, a pulse of positive potential from cathode 1 biases rectifier MR10 so that, with MR5 biased by the positive cathode potential from cathode 1 of MCT1, the junction or "potential point" between MR5 and MR10 becomes positive and a pulse of positive potential passes to the starter electrode of CT2. CT2 fires, extinguishing CT1, and remains alight, and positive potential from the cathode of CT2 passes to the starter electrode of CT3. The next P pulse fires CT3 which steps the discharge in MCT1 from cathode 1 to cathode 2. The same P pulse, as already explained, steps MCT2 from cathode 1 to cathode 0. Positive potential from MCT2 cathode 0 passes through condensers to the starter electrodes of CT1 and CT12. Both tubes fire and CT1 extinguishes CT2. CT12 remains alight, but since CT13 is not alight it does not affect the circuit operation at this time. Thus the discharge in MCT2 has travelled right round the tube and the discharge in MCT1 has moved from cathode 1 to 2.

During the next cycle of discharges in MCT2, when the discharge reaches cathode 2, rectifier MR11 is biased by the positive potential therefrom, and since MCT1 is discharging at cathode 2, MR6 is also biased and a positive potential passes through MR16 to cause refiring of CT2, CT2 extinguishes CT1 and primes CT3 as before. The next P pulse steps the discharge in MCT1 from cathode 2 to 3 and in MCT2 from cathode 2 to 1. The following P pulse steps MCT1 from 3 to 4 and MCT2 from 1 to 0. As before, positive potential from MCT2 cathode 0 passes to CT1 which fires and extinguishes CT2. Thus the discharge in MCT2 has again travelled right round the tube and the discharge in MCT1 has moved from cathode 2 to 4.

During the third cycle of discharges in MCT2, positive potential from cathode 4 biases MR12 and, because MR7 is biased from MCT1 cathode 4, CT2 is again fired. P pulses step MCT1 from cathode 4 to 8 and MCT2 from cathode 4 to 0. Again positive potential from MCT2 cathode 0 fires CT1 extinguishing CT2. MCT1 remains discharging at cathode 8.

During the fourth cycle of discharges in MCT2 positive potential from cathode 8 biases MR14 and, because MR9 is biased from MCT1 cathode 8, CT2 is again fired. P pulses step MCT1 from cathode 8 to cathode 0 and round again to cathode 6 during which time the same P pulses step MCT2 from cathode 8 to 0 to fire CT1 and so extinguish CT2. When the discharge in MCT1 reaches cathode 0, positive potential therefrom passes through a condenser to the starter electrode of CT10. CT10 fires, extinguishing CT11 and biassing MR99 positive, and when MCT2 reaches 0, MR97 is also biased positive, so that the starter electrode of CT14 is made positive and the next P pulse fires CT14 which steps MCT4 from 0 to 1. The same P pulse steps MCT2 from 0 to 9, starting the fifth cycle of discharges in MCT2, and when the discharge therein reaches cathode 9, CT11 is fired, as previously explained, extinguishing CT10 so that the discharges in MCT4 remain on cathode 1.

The fifth cycle of MCT2 continues, this time firing CT2 at cathode 6 and CT13 at cathode 1. P pulses step MCT1 from cathode 6 to cathode 0 and round again to cathode 2 by which time the same P pulses have stepped MCT2 from cathode 6 to 0. Also, with CT13 fired, positive potential from the cathode thereof reaches the starter electrode of CT14 through MR26 and a P pulse fires CT14 and steps MCT4 from 1 to 2. When MCT2 reaches 0, CT1 and CT12 are fired, as already explained, and MR97 is again biased positive, so that with CT10 fired and MR99 biased positive, MCT4 steps to cathode 3. As MCT2 starts its sixth cycle and reaches cathode 9, CT11 fires, as previously explained and extinguishes CT10. Thus, recapitulating the operations of the multi-cathode tubes, MCT2 has made five cycles and is starting the sixth; MCT1 moved successively from 1 to 2 to 4 to 8 to 6 to 2. MCT4 has moved from 0 to 1 during the fourth cycle and from 1 to 3 during the fifth cycle.

Regarding MCT4 as the "tens" element and MCT1 as the "units" element of a decimal number, the movement of MCT4 from 0 to 1 and from 1 to 2 may be regarded as being equivalent to the "carry over" from units to tens in ordinary arithmetic, and it will be understood that MCT4 and

| | |
|---|---|
| MCT1 recorded at the start | 1 |
| At the end of cycle 1 | 2 |
| At the end of cycle 2 | 4 |
| At the end of cycle 3 | 8 |
| At the end of cycle 4 | 16 |
| At the end of cycle 5 | 32 |

Thus, at each cycle, the accumulator increases by the amount presently accumulated, and it will be found that further cycles of operation of MCT 2 result in the geometric series 2, 4, 8, 16, 32 being further extended by one term per cycle. It will be clear to those skilled in the art that further multi-cathode tube circuits and attendant coincidence gates and trigger circuits, similar to MCT4 and its gates and trigger circuits, may be added to FIG. 2 as the "hundreds," "thousands," etc. elements of the decimal number. It will be seen that cathodes 3, 5, 7 and 9 of MCT1 are respectively interconnected with cathodes 3, 5, 7 and 9 of MCT2. With these additional gates, which are only needed in certain embodiments of the invention, it is possible to commence the cycle of operation with the accumulator set to store any desired number. In such a case the switching on sets MCT1 to 0 and MCT4 to 0, but pulse trains representing the digits to be stored are applied to terminals ST for tens and SU for units respectively. One convenient method is for each pulse on SU or ST to be a positive pulse coinciding in timing with a P pulse.

For example, if the number N is 23, then two pulses are applied to ST to set MCT4 to cathode 2. For this purpose the rest cathode for MCT1 would be cathode 0, when its reset connection would be connected thereto instead of to cathode 1. Then three pulses on SU would set MCT1 to cathode 3. The doubling operation occurs in the manner already described. Obviously for doubling from 1 the incoming decimal number would be 1, i.e. one pulse on SU. Thus the geometric series is multiplied by N, 23 in the example specified. In general terms, whatever number is in the accumulator at the start of any cycle of operation of MCT2, that number will be doubled during the next cycle of operation of MCT2. Thus, if the accumulator is set initially to 23, the first cycle of operation of MCT2 will set it to 46 and the next cycle to 92, and so on.

Application of a suitable positive potential to the stop lead connected to the starter electrode of CT4, fires CT4 which extinguishes CT5, stopping the cyclic action of MCT2 without otherwise affecting the circuit.

Turning now to FIG. 3, which operates in conjunction with FIGS. 1 and 2, in a manner to be described, it will be seen that the starter electrodes of CT7 and CT17 are connected through condensers to cathode 0 of MCT2 and that, since MCT2 is normally discharging on cathode 0, CT7 and CT17 will be fired in the same manner as CT1 and CT12, already described. It will also be seen that the starter electrode of CT8 is connected through a condenser to the potential points coming from cathodes 1 to 9 of MCT1 through pairs of opposing rectifiers of groups MR21—25 and MR71—75 and that the mid points of these pairs of opposing rectifiers are connected through further rectifiers MR65—69 to a terminal B. One rectifier of each of these sets of rectifiers forms a single coincidence gate. In like manner, the starter electrode of CT18 is connected to the potential points of all the cathodes of MCT4 through pairs of rectifiers from MR57—65 and MR87—95, the mid points of the pairs of rectifiers being connected to terminal B through rectifiers MR76—84. The starter electrode of CT16 is connected through a condenser to cathode 9 of MCT1 (FIG. 1). MCT3 and MCT5 are normally discharging on their 0 cathodes.

Terminal B is connected, in predetermined manner as will be later described, either to earth or to a suitable positive potential.

Consider first the case when terminal B is connected to a positive potential signal. The rectifiers MR65—69 and MR76—84 are all biased positive and any potential which causes the firing of CT2 (FIG. 1) will also pass through one of the rectifiers MR71—75, as the rectifiers MR65—69 are then biased positive from B, and will cause CT8 to fire with consequent stepping of MCT3. Likewise any potential which causes CT13 to fire will also cause CT18 to fire with consequent stepping of MCT5.

When however terminal B is connected to an earth signal any potentials which cause the firing of CT2 or CT13 are prevented from firing CT8 or CT18, the rectifiers MR21—25 and MR57—65, however, effectively preventing the earth on terminal B from affecting the value of the potentials which fire CT2 and CT13. Thus, when terminal B is connected to a positive potential signal, the accumulator FIG. 3 starts to step in synchronism with the accumulator of FIGS. 1 and 2 and stops stepping when the accumulator of FIGS. 1 and 2 stops stepping i.e. whenever MCT2 reaches 0. The action of the gate CT15, CT16 (FIG. 3), although similar to that of CT10, CT11 (FIG. 2), is independent thereof and serves only to pass carry over pulses from MCT3 to MCT5 as required.

It will be seen, therefore, that the application of a predetermined train of earth and positive potential impulse signals to the terminal B, which train of signals may be moved whenever the discharges in the accumulators are not moving, i.e. whenever MCT2 is discharging on cathode 0, (for which purpose the positive potential pulse on MCT2 cathode 0 may be employed at terminal C to which MCT2 cathode 0 is connected), will cause the accumulator FIG. 3 to step with MCT1 and MCT4 on positive potential signals but not on earth signals.

For example, suppose the train of signals battery, battery, earth, battery, be applied to terminal B. With the first signal, battery, on B, a positive pulse on the start lead causes CT5 to fire and MCT2 to step, as already explained. When MCT2 reaches cathode 1 and MCT1 moves from cathode 1 to 2, MCT3 moves from cathode 0 to 1. When MCT2 reaches 0, MCT1 and MCT3 stop and positive potential from MCT2 cathode 0 is applied to terminal C and, as already explained, may be used to cause the next or second signal, which is also battery, to be applied to B. When MCT2 reaches cathode 2, MCT1 steps, as already explained, from cathode 2 to 4, and MCT3 steps from cathode 1 to 3. When MCT2 reaches 0, MCT1 and MCT3 stop and the potential applied to terminal C may now cause the next signal, which is an earth signal to be applied to B. When MCT2 reaches cathode 4, MCT1 steps from cathode 4 to 8, as already explained, but MCT3 does not step, since the earth on B prevents the starting potential which started CT2 from reaching CT8. MCT2 again reaches 0, MCT1 stops and the potential applied to C may now cause the last signal which is a battery signal, to be applied to B. MCT2 reaches cathode 8 and both MCT1 and MCT3 step. MCT1 takes 8 steps, MCT4 taking one "carry over" step while MCT2 is travelling from cathode 8 to 0, and since MCT3 starts with MCT1 and stops when MCT2 reaches cathode 0, MCT3 takes 8 steps, i.e. it moves from cathode 3 round to cathode 1, MCT5 taking one "carry over" step and moving from cathode 0 to 1. Potential applied to C may now cause removal of the battery signal from B and application of a stop signal to the stop lead.

It may sometimes happen that simultaneous carry overs may occur at adjacent multi-cathode tubes in one or more of the accumulators. For example, at the end of a cycle of MCT2, CT15 may be firing and MCT5 may be firing on its cathode 9. As already explained, MCT5 will be stepped from 9 to 0 while MCT2 steps from 0 to 1 and will attempt to pass on a carry over pulse to the "hundreds" tube circuit. Since, however, MCT2 has already reached 9, this pulse will be ineffective to affect the hundreds tube. The situation described may arise between any pair of multi-cathode tubes in any accumulator, and FIG. 4 which will now be described in conjunction with FIG. 3 is equally applicable to the accumulators of FIGS. 1 and 2.

Whereas MCT3 and MCT5 represents the units and tens digits respectively of the accumulator or register in FIG. 3, in FIG. 4, MCT6 and MCT7 represent respectively the hundreds and thousands digits of the same register. The circuits for these two tubes are similar to that for MCT5 but, for simplicity, the start-stop pairs of tubes (equivalent to CT17 and 19) have been omitted. The circuit is best described by considering the following possible examples which illustrate practical cases.

(a) When the tube (MCT2) reaches cathode 0, with a carry over held by CT15, MCT5 on cathode 9 and MCT6 and MCT7 on, say, cathodes 4 and 1 respectively.

(b) As for (a) except MCT6 is on cathode 9.

(c) As for (a) except MCT6 and MCT7 are on cathodes 9.

(d) When MCT2 reaches cathode 0, with a carry over held by CT22, MCT6 on cathode 9 and MCT7 is on cathode 1.

*Case (a)*

As already described, when MCT2 reaches cathode 0, if CT15 is struck (from cathode 0 of MCT3), MR102, MR103 and MR104 will all be biassed positive, so that a pulse will be admitted by gate tube CT19 and MCT5 will step one position. However, in the case considered MCT5 is on cathode 9, so that it will step to cathode 0. This causes a positive pulse to pass to the starter of CT22 via MR110 which would cause CT22 to strike, but, as will be shown in the following, CT22 will have been struck already from another source, so that the pulse from cathode 0 will have no effect. This arrangement is to ensure that all carries are passed on at the same time, so that when MCT2 has stepped to cathode 9 all carries can be erased.

When the rectifiers MR102, MR103 and MR104 are simultaneously biassed positive, a positve potential is applied to MR107. Since MCT5, is on cathode 9, MR108 will be biassed positive, and the combination of the biasses on MR107 and MR108 will cause CT22 to strike via MR109. Thus MR114, MR115 and MR116 will also be biassed positive, so that, when MCT2 steps from 0 to 9, not only will MCT5 step one position, i.e. to cathode 0, but also MCT6 will step from cathode 4 to cathode 5. There will be no passing of the carry to further stages for MR112 and MR113 will be to earth. When MCT2 reaches cathode 9 CT16 and CT23 will strike, thus extinguishing CT15 and CT22. The positive pulse passed from MCT5 cathode 0 will have no effect.

*Case (b)*

CT22 will be struck via MR109, as described for case (a). Also MR111 and MR112 will be biassed positive, so that CT25 is struck via MR120. It should be noted that MR118 and MR113 will also be biassed positive, thus causing a positive pulse to pass to CT25 via MR119. It is possible to produce the simultaneous carry by this means, but, in practice, there is a small delay between the application of a pulse and the striking of a tube, and, since the simultaneous carry may have to pass through several stages, the cumulative delay of several such tubes might cause a stepping pulse to be missed in the higher significant stages. For this reason the circuit has not been made dependent on this mode of operation; this portion of the circuit is used only for the origination of a simultaneous carry.

When MCT2 steps from 9 to 0, MCT7 will also step one position, as well as MCT5 and MCT6. The carry tubes are again extinguished when MCT2 reaches cathode 9. Since MCT7 was on cathode 1, MR126 and MR127 were at earth, so that the carry could not pass to subsequent stages.

*Case (c)*

CT22 and CT25 will be struck, as described for case (b). When MR120 is biassed positive due to MR111 and MR112, a positive pulse passes to the grid of cathode follower V1, causing the cathode to become more positive for the duration of the pulse. A positive bias is applied to MR128 via the resistance-capacity network which, in conjunction with the positive bias on MR126 from MCT7 cathode 9, causes a positive pulse to pass to CT28 (not shown), the carry tube following MCT7, thus striking this tube. Thus when MCT2 steps from 0 to 9, MCT5, MCT6, MCT7 and MCT8 (not shown in the diagram) will all step one position. The carry tubes are extinguished from MCT2 cathode 9.

*Case (d)*

As mentioned earlier, a carry over has to be passed beyond a multicathode tube the carry tube of which was struck during the same cycle of the doubler. Thus, in the case under consideration, if CT15 is struck, the carry passes to MCT6 but does not have to proceed further, and has no effect beyond MCT6. MR108 will be to earth, thus blocking any carry from CT15 to other tubes than MCT6.

With CT22 struck, MR115 is biassed positive. This bias, in conjunction with the positive bias on MR114 and MR116, opens gate tube CT24, thus enabling a carry pulse to pass to MCT6. Also MR118 will be biassed positive and, since MCT6 is assumed to be on cathode 9, MR113 will be biassed positive. The effect of these biasses is to strike CT25 via MR119. MR121, MR122 and MR123 are now all biassed positive so that gate tube CT27 will be opened. Since MCT7 is assumed to be on cathode 1, MR126 and MR127 will be to earth, so that no carry can pass beyond them. When MCT2 steps from cathode 0 to cathode 9, MCT6 and MCT7 will both step one position after which CT23 and CT26 will strike, thus extinguishing CT22 and CT25.

In certain circumstances it is possible that a simultaneous carry may have to pass to several stages. This means that the original pulse has to pass through several cathode followers in series and, since the gain of a cathode follower is less than unity, the pulses produced at later stages might be insufficient to strike the carry tubes. This difficulty can be overcome by the use of step-up pulse transformers. The primaries of such transformers would be connected in the cathode circuits of the cathode followers and the secondaries would replace the resistance-capacity networks from the cathodes.

A further modification comprises reshaping the carry pulses in known manner.

In order that an indication may be given of the position of the accumulator FIG. 3, suitable indicators, which may be of electronic type, may be connected to the cathodes of the tubes MCT3 and 5. Suitable indicators may also be connected to the cathodes of MCT1 and 4 to indicate the position of accumulator FIGS. 1 and 2. Furthermore, a third accumulator may be added to the equipment and arranged, by those skilled in the art, to step with MCT1 and 4 when MCT3 and 5 do not step and to remain stationary when MCT3 and 5 do step and to have indicators therefrom such that the sum of the indications from the third accumulator and MCT3 and 5 is equal to the indication from MCT1 and 4 when the equipment is operating satisfactorily. Such an accumulator would be controlled from MCT2 and the first accumulator in the same way as the accumulator of FIG. 3, except that its terminal corresponding to B would be positive when B was at earth and at earth when B was positive. Thus pulse trains not sent to the second accumulator would be sent to the third accumulator.

If the battery and earth signals are used to represent respectively 1 and 0 in binary notation, the train of signals applied to B represents a number in binary notation, the first signal being the element of lowest denomination. Thus battery, battery, earth, battery, may represent respectively 1101 which, when written with the element of highest denomination at the left becomes 1011 and which in decimal notation is 11. It will be observed that, in the example described, the accumulator of FIGS. 1 and 2 advanced 15 steps, which number is the decimal equivalent of 1111 binary, while the accumulator of FIGS. 4 and 5 advanced 11 steps which, as stated, is the decimal equivalent of 1011 binary.

It will be clear to those skilled in the art that with a decimal number, such as 23, initially in MCT4 and MCT1, the application to B, in the manner described, of a train of signals representative of a binary number, such as 1011 (equals 11 decimally), causes the accumulator of FIGS. 1 and 2 to advance by an amount equal to the decimal number multiplied by 1111 (binary), e.g. 23×15, and causes the accumulator of FIGS. 4 and 5 to advance by an amount equal to the decimal number multiplied by 1011 (binary), e.g. 23×11, the advance in both cases being according to decimal notation.

The various multi-cathode tubes, MCT1–5, according to the embodiment already described, each have ten cathodes and the system operates on a decimal basis and may have, as already stated, a train of signals representative of a binary number applied to terminal B, but it will be clear that the tubes may have a greater or lesser number of cathodes than 10 and that the system may operate on a basis other than binary. For example, suppose the tubes MCT1, 2 and 3 have seven cathodes each, the maximum number of steps which MCT1 or 2 can take is governed by MCT1 and is now 6, and the arrangement works on a septenary basis, MCT1 and 3 passing a "carry over" pulse to MCT4 and 5 respectively when they themselves have made seven steps.

Suppose again the tubes MCT1, 2 and 3 have twelve cathodes each. The arrangement then works on a duo-decimal basis and, in conjunction with tubes MCT4 and 5 which have 20 cathodes, and further stages of tubes from MCT4 and 5 which may have 10 cathodes, is suitable for multiplying sums of money in sterling by numbers expressed in binary notation. In such a modification, the connections between the cathodes of the tubes MCT4 and 5 representing the "shillings," and the further tubes representing the "pounds," to the cathodes of the MCT2 tubes would be modified accordingly, as is clear to those skilled in the art.

Although multi-cathode tubes have been shown and described in the embodiment, it is clear that chains of interconnected individual discharge tubes could be used in place of any or all of them, or they could be replaced by other forms of static electrical switches.

While the principles of the invention have been described above in connection with specific embodiments, and particular modifications thereof, it is to be clearly understood that this description is made only by way of example and not as a limitation on the scope of the invention.

What we claim is:

1. Electrical equipment comprising a source of electrical pulses, means for generating pulse arrangements in sequence from said source representing numbers in a first notation which are in the geometric progression of a second notation, an accumulator for totaling said pulse arrangements, selecting means for selecting certain of said pulse arrangements for totaling, means for applying said selected pulse arrangements to said accumulator, said accumulator comprising a plurality of electronic storage devices each of which is individual to a single digital denomination of said first notation, an electronic carry-over device interconnecting each said storage device and the storage device individual to the next higher digital denomination, a second accumulator for totaling received pulse arrangements, and means for applying all of said pulse arrangements to said second accumulator.

2. Equipment, as claimed in claim 1, and in which said means for generating in sequence a plurality of pulse arrangements comprises a cyclic pulse distributor, means for applying pulses from said source to said distributor to cause said distributor to step through a predetermined cycle, means under control of said distributor for generating a pulse arrangement consisting of one or a plurality of pulse trains during each said cycle, and electronic means under control of the settings of said storage devices of said second totalling device for determining that part of said cycle which forms the pulse train so generated, whereby the number of pulses forming each said trains is determined by a different one of said storage devices.

3. Electrical equipment which comprises a source of electrical pulses, a first accumulator comprising a plurality of electronic storage devices each of which is individual to a single digital denomination and an electronic carry-over device interconnecting each said electronic storage device and the electronic storage device individual to the next higher digital denomination, said accumulator being initially set at the storage device representing "0," a second accumulator of the same type as said first accumulator and which is initially set at the storage device representing "1," an electronic pulse distributor, means for applying pulses from said source to said distributor to step said distributor repeatedly through a predetermined cycle, means under control jointly of the settings of said distributor and of said second accumulator for generating one or more pulse trains on each cycle of said distributor, the number of pulses in the train or trains so generated representing a number equal to that number represented by the signal momently stored on said second accumulator, means for applying all the pulse trains so generated to said second accumulator, each said train being applied to the storage device appropriate to its denominational significance, whereby the pulse train or pulse trains generated on successive cycles of said distributor represent numbers which are in geometric progression, selecting means for selecting certain of said pulse trains, means for applying the pulse trains so selected to said first accumulator for totalling thereby, and means responsive to the reception of a signal representing a number expressed in binary digital code for controlling the selection of said pulse trains to be totalled, means for receiving said signal representing the binary number digit by digit with the least significant digit being received first and with each digit being present during a single cycle of said distributor, said selecting means including means responsive to the receipt of a momently received signal representing binary digit "1" for applying the pulse train or pulse trains generated during that cycle of the distributor to said first accumulator and responsive to the receipt of a momently received signal representing binary digit "0" for applying no pulse trains to said first accumulator, whereby after the cycle of said distributor during which the signal representing the last digit of said binary number is received, the signal stored in each first accumulator represents the equivalent in the form of notation peculiar to that accumulator of said binary number.

4. Electrical equipment which comprises a source of electrical pulses, a first accumulator comprising a plurality of electronic storage devices each of which is individual to a single digital denomination and an electronic carry-over device interconnecting each said electronic storage device and the electronic storage device individual to the next higher digital denomination, said accumulator being initially set at the storage device representing "0," a second accumulator of the same type as said first accumulator and which is initially set to store a signal representing a first number, an electronic pulse distributor, means for applying pulses from said source to said distributor to step said distributor repeatedly through a predetermined cycle, means under control jointly of the settings of said distributor and of said second accumulator for generating one or more pulse trains on each cycle of said distributor, the number of pulses in the train or trains so generated representing a number equal to that number represented by the signal momently stored on said second accumulator, means for applying all the pulse trains so generated to said second accumulator, each said train being applied to the storage device appropriate to its denominational significance, whereby the pulse train or pulse trains generated on successive cycles of said distributor represent numbers which are in geometric progression, selecting means for selecting certain of said pulse trains, means for applying the pulse trains so selected to said first accumulator for totalling thereby, and means responsive to the reception of a signal in binary digital code representing a second number for controlling the selection of said pulse trains to be totalled, in which the signal representing said second number is received digit by digit with the least significant digit being received first and with each digit being present during a single cycle of said distributor, said selecting means including means responsive to the receipt of a momently received signal representing binary digit "1" for applying the pulse train or pulse trains generated during that cycle of said distributor to said first accumulator and responsive to the receipt of a momently received signal representing binary digit "0" for applying no pulse trains to said first accumulator, whereby after the cycle of said distributor during which the signal representing the last binary digit of said second number is received, the signal stored in said first accumulator represents the product of said first and said second numbers.

5. Equipment, as claimed in claim 4, and in which said distributor and each storage device of said accumulators is a single multi-gap cold cathode gaseous discharge tube, of the type in which a discharge is caused to travel from gap to gap in a predetermined direction under the control of a train of applied pulses, and which comprises a plurality of coincidence gate circuits which each interconnect one cathode of said distributor and the corresponding cathode of one of said multi-gap tubes of the second accumulator, the cathodes of said two tubes being reversely numbered, means responsive to the detection by one of said gates that both of its controlling cathodes are discharging for initiating one of said pulse trains, and means responsive to the discharge in said distributor tube reaching its final cathode for terminating all pulse trains momently being generated, there being a similar set of coincidence gate circuits associated with each multi-gap tube of said second accumulator.

6. Equipment, as claimed in claim 5, in which the means for selecting which pulse trains are to be applied to the respective storage devices of the first accumulator comprises a plurality of coincidence gate circuits for each digital denomination interconnecting each cathode of the distributor and the corresponding cathode of the storage devices, each said coincidence gate circuit having an additional control lead, means for applying the received signals representing the binary digits to said additional control leads and means responsive to the detection by one of said gate circuits of the coincidence of the discharging of both of its controlling cathodes and the reception of a signal representing a binary "1" for causing the pulse trains then initiated to be applied to the appropriate storage device of said first accumulator.

7. Equipment, as claimed in claim 6, and in which said means for applying pulse trains to one of said storage devices is a gating circuit which comprises a pair of tubes connected to operate as a flip-flop circuit of the either side stable type in which the first tube is normally discharging, a gating tube controlled by said flip-flop circuit for applying pulses from said pulse source to reach its storage device when the second tube of said flip-flop circuit is discharging, and means responsive to one of the plurality of coincidence gates associated with that storage device for operating said flip-flop circuit to its second condition.

8. Equipment, as claimed in claim 7, and in which each electronic carry-over device comprises a pair of tubes connected to operate as a flip-flop circuit of the either-side-stable type in which the first tube is normally discharging, and means responsive to the discharge in the lower of the two multi-gap tubes with which said flip-flop circuit is connected reaching its zero cathode to operate the second tube of said flip-flop circuit, means responsive to operation of said second tube for applying a single pulse to the higher of the two multi-gap tubes with which said flip-flop circuit is associated, and means responsive to said distributor commencing its next cycle for restoring said flip-flop circuit to its normal condition.

References Cited in the file of this patent

UNITED STATES PATENTS

| | | |
|---|---|---|
| 2,318,591 | Couffignal | May 11, 1943 |
| 2,364,540 | Luhn | Dec. 5, 1944 |
| 2,401,621 | Desch et al. | June 4, 1946 |
| 2,409,689 | Morton | Oct. 22, 1946 |
| 2,442,428 | Mumma | June 1, 1948 |
| 2,445,215 | Flory | July 13, 1948 |
| 2,473,159 | Lyman | June 14, 1949 |
| 2,544,126 | Baldwin | Mar. 6, 1951 |
| 2,623,115 | Woods-Hill | Dec. 23, 1952 |
| 2,624,508 | Dickinson | Jan. 6, 1953 |
| 2,657,856 | Edwards | Nov. 3, 1953 |
| 2,714,179 | Thomas et al. | July 26, 1955 |